(12) United States Patent
Perkins et al.

(10) Patent No.: US 8,387,158 B2
(45) Date of Patent: Feb. 26, 2013

(54) LASER GUIDED TIP APPROACH WITH 3D REGISTRATION TO A SURFACE

(75) Inventors: Thomas T Perkins, Boulder, CO (US); Gavin M King, Columbia, MO (US); Ashley R Carter, Cambridge, MA (US)

(73) Assignee: The United States of America as represented by the Secretary of Commerce, The National Institute of Standards and Technology, Washington, DC (US)

( * ) Notice: Subject to any disclaimer, the term of this patent is extended or adjusted under 35 U.S.C. 154(b) by 237 days.

(21) Appl. No.: 12/806,086

(22) Filed: Aug. 5, 2010

(65) Prior Publication Data

US 2011/0035848 A1 Feb. 10, 2011

Related U.S. Application Data

(60) Provisional application No. 61/231,402, filed on Aug. 5, 2009.

(51) Int. Cl.
*G01Q 20/02* (2010.01)
(52) U.S. Cl. ............. 850/6; 850/1; 850/2; 850/3; 850/5; 850/33
(58) Field of Classification Search .................. 850/1, 2, 850/3, 4, 5, 10, 33; 356/450, 477, 496, 500
See application file for complete search history.

(56) References Cited

U.S. PATENT DOCUMENTS

| 4,370,721 | A | * | 1/1983 | Berenberg et al. ............ 700/195 |
| 5,486,919 | A | | 1/1996 | Tsuji et al. |
| 6,310,342 | B1 | * | 10/2001 | Braunstein et al. ............... 850/2 |
| 6,718,821 | B1 | | 4/2004 | Houston et al. |
| 2006/0215171 | A1 | | 9/2006 | Nakata et al. |
| 2007/0180889 | A1 | | 8/2007 | Murayama et al. |
| 2010/0257641 | A1 | * | 10/2010 | Perkins et al. .................... 850/1 |
| 2010/0263098 | A1 | * | 10/2010 | Muller et al. ................... 850/33 |
| 2012/0080612 | A1 | * | 4/2012 | Grego et al. ............... 250/458.1 |

OTHER PUBLICATIONS

U.S. Appl. No. 60/725,203, Perkins et al.
Carter, A. R., King, G. M. & Perkins, T. T. Back-scattered detection provides atomic-scale localization precision, stability, and registration in 3D. Opt Express 15, 13434-1, 2007.
Carter, A. R., King, G. M., et al., Stabilization of an Optical Microscope in Three Dimensions., Appl. Opt. 46(3): 421-7 (2007).
King, Carter, Churnside, Eberle, & Perkins, Ultrastable AFM: atomic-scale lateral stability and registration in ambient condition. Nano Lett 9, 1451-1456 (2009).
Moon, Kupec et al., Atomic-force lithography w. interferometric tip-to-substrate position metrology, J. Vac. Sci. Technol. B 25(6):2284-2287(2007).

* cited by examiner

*Primary Examiner* — David A Vanore
*Assistant Examiner* — Nicole Ippolito

(57) ABSTRACT

The present invention relates to a method of rapidly and repeatably bringing sharp objects into close proximity to a particular region of interest of a sample with high precision and accuracy in two or three dimensions using a laser guided tip approach with three dimensional registration to the surface.

20 Claims, 6 Drawing Sheets

LASER GUIDED TIP APPROACH WITH 3D REGISTRATION TO A SURFACE

CROSS REFERENCE TO RELATED APPLICATIONS

Reference is made and priority claimed to U.S. Provisional Application Ser. No. 61/231,402 by T. Perkins et al. entitled "LASER GUIDED TIP APPROACH WITH 3D REGISTRATION TO A SURFACE", filed Aug. 5, 2009, the disclosure of which is incorporated herein by reference.

STATEMENT AS TO RIGHTS TO INVENTIONS MADE UNDER FEDERALLY-SPONSORED RESEARCH AND DEVELOPMENT

The Laser Guided Tip Approach with 3D Registration to a Surface was developed with funds from the National Institute of Standards and Technology.

FIELD OF THE INVENTION

The present invention relates to a method of rapidly and repeatably bringing sharp objects into close proximity to a particular region of a surface with high precision and accuracy in one, two or three dimensions.

BACKGROUND OF THE INVENTION

In a typical atomic force microscope, coarse approach between tip and sample is achieved via a translation by a long range stage followed by a fine stage movement (0.1-1000 nm). If a specific surface is not found, this process is repeated. Often, optical microscopes are used to aid in this process.

Prior art does not allow registered tip exchange due to the lack of a reliable method to yield precise three dimensional, simultaneous localization of a tip and a sample surface. This knowledge is necessary in order to bring these objects into close proximity or contact with high registration.

There was a previous need in the art for a method and system of alignment, stabilization and registration that minimizes apparent or real drill. This need was satisfied by Pat. Appl. No. 60/725,203, entitled "REAL-TIME, ACTIVE PICOMETER-SCALE ALIGNMENT, STABILIZATION, AND REGISTRATION IN ONE OR MORE DIMENSIONS", incorporated herein by reference. The invention provides a process for positioning two or more structures to picometer-scale precision over short (typically approximately 0.01 s) and long (typically approximately >100 s) time scales. In addition, the invention also provides a method for picometer-scale alignment. The method provides a one, or more dimensional positional stabilizing technique, which is particularly effective when used with structures that either contain a fiducial mark that is firmly coupled to the sample, or a sample which has an inherent property that interacts with light to act as though it is a fiducial mark (e.g. a lens or a rough surface). This method, while useful as part of the present technique, does not address the replacement of tips or describe how to return to a previous position.

Carter, A. R., King, G. M. & Perkins, T. T. *Back-scattered detection provides atomic-scale localization precision, stability, and registration in 3D.* Opt Express 15, 13434-13445 (2007) discloses stabilization of the sample, but fails to disclose any data on scanning probe tips as described in the present invention.

Carter, A. R., King, G. M., et al., *Stabilization of an Optical Microscope in Three Dimensions.* Appl. Opt. 46(3): 421-7 (2007) discloses stabilization of the sample, but fails to disclose any data on scanning probe tips as described in the present invention.

King, G. M., Carter, A. R., Churnside, A. B., Eberle, L. S. & Perkins, T. T. *Ultrastable atomic force microscopy: atomic-scale lateral stability and registration in ambient condition.* Nano Lett. 9, 1451-1456 (2009) discloses 3D control of an AFM tip, but fails to disclose registered exchange or tip approach as described in the present invention.

Moon, E. E., Smith, H. I., *Nanometer-precision Pattern Registration for Scanning-probe Lithographies Using Interferometric-spatial-phase Imaging.* J. Vac. Sci. Technol. B 24(6): 3083-3087 (2006) discloses a method to stabilize a tip with respect to a sample with nanometer scale using interferometric gratings, but fails to disclose registered exchange or tip approach with other than interferometric techniques based on a grating affixed to the cantilever base and embedded in the sample as described in the present invention.

PROBLEM TO BE SOLVED

In atomic force microscopy (AFM), it is currently not possible to reliably exchange tips and return to the same nanoscale feature. This is exacerbated by samples that lack surface height variation. The present invention demonstrates that an individual nanoscale object can be successfully imaged by the same tip after retraction and re-approach, as well as after an exchange of tips. Finally, different types of tips can be exchanged and the same feature imaged and reimaged.

SUMMARY OF THE INVENTION

The present invention relates to a method for rapidly and repeatably bringing sharp objects into close proximity to a particular region of interest of a surface comprising projecting laser light onto a first tip region of a scanning probe microscope to produce back-scattered light, projecting laser light onto a region of interest of a sample to produce back-scattered light, receiving the back-scattered light by a photosensitive device, the photosensitive device converting the received back-scattered light into one of electrical or optical signals capable of identifying the dimensional positions of the first tip region and the region of interest, aligning the positions with respect to the laser light, providing an output control signal related to the signal output from the photosensitive device from a feedback algorithm/process to a precision positioner to stably maintain the positions over a time interval, removing the first tip of the scanning probe microscope, replacing the first tip of the scanning probe microscope with a second tip, and returning the second tip to the identified dimensional positions of the first tip and the region of interest with the precision positioner. The present invention also relates to a method for rapidly and repeatably bringing sharp objects into close proximity to a particular region of a surface comprising projecting laser light onto a tip region of a scanning probe microscope to produce back-scattered light, projecting laser light onto a first region of interest of a sample to produce back-scattered light, receiving the back-scattered light by a photosensitive device, the photosensitive device converting the received back-scattered light into one of electrical or optical signals capable of identifying the dimensional positions of the tip region and the first region of interest of a sample, aligning the positions with respect to the laser light, providing an output control signal related to the signal output from the photosensitive device from a feedback algorithm/process to a precision positioner to stably maintain the positions over a time interval, replacing the first region of interest of a sample with a second region of interest of a sample, projecting laser light onto this second region of interest of a sample to produce back-scattered light and repeating the steps of receiving the back-scattered light by a photosensitive device, aligning the positions with respect to the laser light, providing an output control signal related to the signal output from the photosensitive device from a feedback algorithm/process to a precision positioner to stably maintain the positions over a time interval with respect to the tip region and the second region of interest of a sample, and returning the tip region to the identified dimensional positions of the tip region and the first region of interest with the precision positioner. This method may be repeated as desired with additional regions of interest of a sample.

ADVANTAGEOUS EFFECT OF THE INVENTION

The present invention includes several advantages, not all of which are incorporated in a single embodiment. The present invention actively decreases drift and can be used to generate nanometer-scale registration between the tip and sample even after exchanging tips. The present invention is expected to expedite atomic force microscope (AFM) images of biological samples and also enables atomic force microscopy with the ability to swap tips for different functionality akin to a nanoscale milling machine. Finally, the present invention allows the return to specific features after long times, as in incubations (hours to days), which may be necessary in chemical or biological processing.

BRIEF DESCRIPTION OF THE DRAWINGS

FIG. 1(B) illustrates a representative device for use with opaque samples.

DETAILED DESCRIPTION OF THE INVENTION

Figure 1:
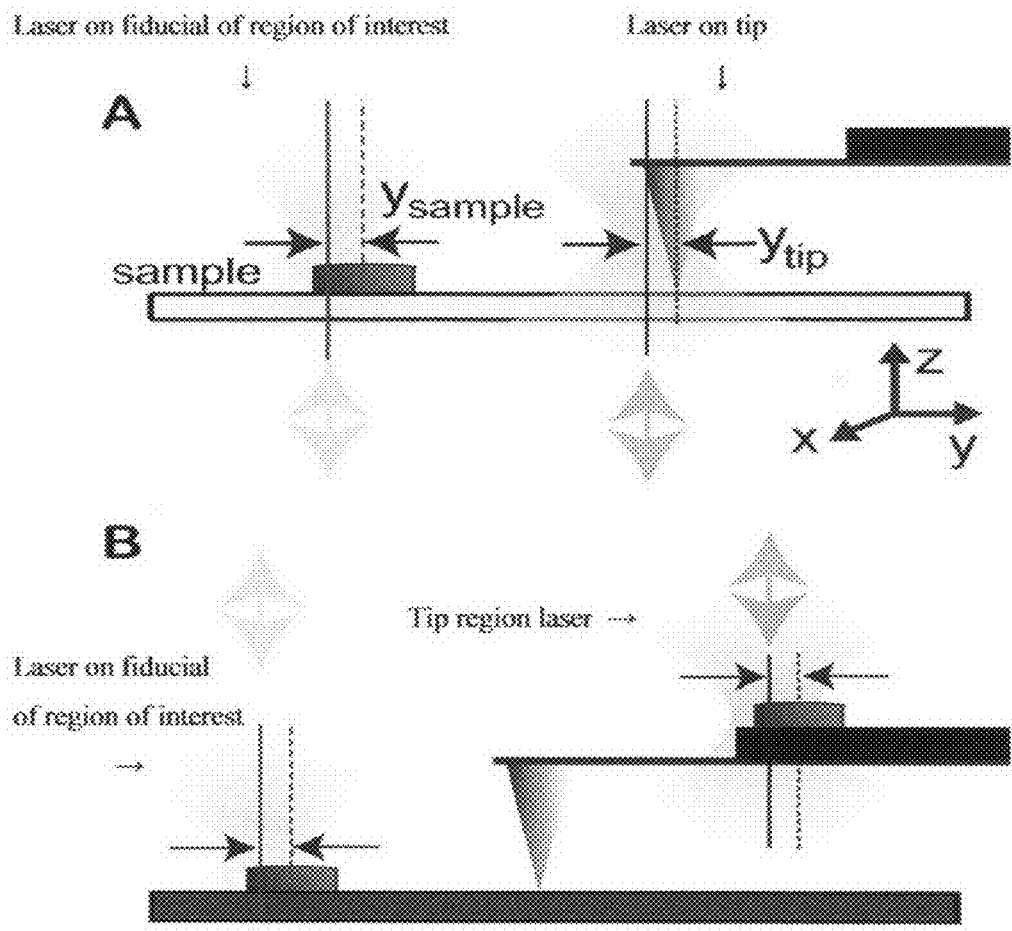
FIG. 1 (A) illustrates a representative microscopic device for use with the present invention comprising two focused lasers measuring tip and sample position by separately scattering off the tip and a fiducial mark engineered into the sample.

The present invention introduces a technique which allows sharp objects to be rapidly brought into close proximity to a particular region of interest of a surface with high precision and accuracy in one, two or three dimensions. The method has potential applications in a broad array of tip-based research instrumentation and manufacturing techniques, including scanning probe microscopy, atomic force microscopy, proximal probe lithography, dip-pen lithography, tip-indent lithography, molecule array manufacturing, and single atom manipulation, as well as optical microscopy, local probe lithography, semiconductor patterning including semiconductor wafer and mask alignment, and operating optical tweezers. The region of interest according to the present invention contains a fiducial mark, object, structure or feature to be imaged or studied. The region of interest of the sample may also be the fiducial mark, object, structure or feature itself. The region of interest may also be located at a lateral offset from a fiducial mark.

The method disclosed herein utilizes at least one, but preferably two, laser beams to detect tip and sample dimensional position in real time and with atomic scale precision. One beam is used to localize the surface via light scattering off a fiducial mark in or on the surface, as described in Carter, A. R., King, G. M. & Perkins, T. T. *Back-scattered detection provides atomic-scale localization precision, stability, and registration in 3D*. Opt Express 15, 13434-13445 (2007), incorporated herein by reference. Another laser is used to localize the tip in a similar manner, as described in King, G. M., Carter, A. R., Churnside, A. B., Eberle, L. S. & Perkins, T. T. *Ultrastable atomic force microscopy: atomic-scale lateral stability and registration in ambient condition*. Nano Lett. 9, 1451-1456 (2009), incorporated herein by reference. Automated centering of the beams to their respective objects (i.e. tip, surface) is possible. Either the tip or the sample (or both) are affixed to a precision positioner, such as a piezoelectric transducer (PZT) stage, which generates rapid, precise displacements. Optical signals from both beams guide the tip-surface registration at the nanometer-scale level. The tip exchange process can begin with the tip safely oriented approximately 1 micron above the surface and can terminate with the tip localized to a particular distance above the surface (e.g. 5 nm) and to a particular lateral position with respect to the surface. Automated motion of the lasers, via, for example, lenses or mirrors, could be used to independently move the foci of the beams and increase the range of the controlled approach.

The method allows for rapid tip replacement and surface registered re-engagement during a manufacturing process or an experiment. Additionally multiple tips could be toggled into and out of engagement with the surface at a well defined surface location to enable complex manufacturing processes requiring multiple tips, for example, one tip for fine feature manufacturing, one for coarse manufacturing, one for device/feature evaluation. The exchange of multiple tips to measure or modify the same atomic-scale feature is enabled by the detection lasers. This "laser guided approach" is possible because the tip dimensional position will be fully and accurately defined with respect to the sample through the laser-based reference frame. After replacing a tip, the user can re-align the new tip to the laser and be assured that its alignment on the sample is the same. This ability is particularly useful in the field of nanomanufacturing, where a process may require two tips with different functions. Further, one tip may be required to manipulate a sample and another to image the final product for quality assurance.

Specifically, the process starts with a scanning probe microscope having a tip, an electronically controllable stage with subnanometer capability, and a pair of lasers. One of the lasers is focused on the tip or a fiducial mark engineered near the tip, rather than the back side of the cantilever. A sample on a substrate is provided, which either includes a fiducial or can itself function as the fiducial. The second laser is focused on the sample/fiducial to generate a back-scatter signal. The focused laser light scatters off the mark and can be detected in transmission or reflection geometries by detecting either forward or back-scattered light respectively. There are one or more photosensitive detectors. The photosensitive device, in response to receiving the scattered light, outputs signals which reveal the dimensional position of each fiducial mark, and hence the dimensional position of each structure. These signals are used in a feedback loop to keep the differential position stable, or to permit the precise scanning of the position between the two structures. The structure is aligned by translating it through the laser beam to generate a calibration curve. There can be an alignment of two or more independent structures relative to each other, or relative to a shift of a known center, or the structures can be raster scanned with respect to each other. The calibration curve can also be attained by moving the laser beam through the structure. The sample's and tip's dimensional positions were controlled via a feedback loop associated with precision positioners, to which the sample, tip, or both are connected. The tip is retracted, replaced and the above process is repeated.

By aligning the position of an atomic force microscope tip and the sample to a pair of focused laser beams, the tips can be exchanged and the same individual feature can be rapidly reimaged with nanometer-scale registration. The individual tips could be retracted and realigned, which could be useful for cleaning them to remove surface absorbed proteins that could introduce artifacts. Other types of processing are also possible after the tip is removed and before being replaced.

Different individual tips of the same type have slightly different shapes due to the manufacturing process, which leads to an offset between the optical center of the tip measured by scattering off the front side of the tip and its true mechanical apex. The limit to this technique is expected to be about 1-5 nm, based on the curvature of the tip and any atomic-scale protrusions from the tip that are not centered with respect to the optical axes of the tip. Different style tips and different tilts to the cantilever also have a reproducible offset, which can be quantized and removed.

Two dimensional registration can also be done by putting a fiducial mark on the back side of the cantilever chip (e.g. at the base of the cantilever) and doing back-scatter detection (BSD) from the atomic force microscope side (e.g. with the lasers not going through the sample). While there is an offset to the mechanical imaging point, time variation in this offset would be small due to its limited distance (3-100 µm) and compatible with general methods for producing and using commercial atomic force microscope tips. This is in contrast to the complexity of the interferometric-spatial-phase imaging atomic force microscope tip sample stabilization process put forward by the MIT work described in Moon, E. E., Kupec, J., Mondol, M. K., Smith, H. I. & Berggren, K. K. *Atomic-force lithography with interferometric tip-to-substrate position metrology.* J. Vac. Sci. Technol. B 25, 2284-2287 (2007), incorporated herein by reference.

The ability to align the tip in three dimensions with respect to a laser foci also suggests a method to gently and reproducibly bring the tip down to the surface in a controlled manner through an series of alignments of the tip to the laser, followed by movement of the atomic force microscope assembly and a compensated motion of the z-foci of its detection laser (e.g. a movement of a lens).

The present method can be performed using a wide variety of scanning probe microscope (SPM) tips. The preferred embodiment, which is in no way limiting, is an optically stabilized atomic force microscope (AFM) integrated with a customized inverted optical microscope. Two independently steered laser beams are focused to show diffraction limited spots by a high NA objective lens placed below the sample plane.

A representative microscope comprises a light source, preferably a laser, for providing coherent light incident on a fiducial mark, a photosensitive device for receiving at least a portion of the light scattered off the fiducial mark and which generates a signal in response to the scattered light received, a precision positioner, which can be moved in accordance with the signals generated by the photosensitive device's reception of scattered light from the fiducial marks, a feedback loop, including a feedback algorithm/processor to provide an output signal that is related to a characteristic of the input signal generated by the photosensitive device and received by the feedback loop, to provide a control signal that controls movement of the precision positioner.

As shown in FIG. 1A, one laser beam is focused onto the apex of an atomic force microscope tip, and a second beam onto a fiducial mark engineered into the sample. Back-scattered light from each beam is collected and used to deduce the dimensional position of each object relative to its detection laser focus. The extreme differential pointing stability between the foci (0.02 nm) leads to an optically based reference frame that can stabilize the tip relative to the sample. This local detection of the tip-sample separation (z-tip) is independent of the standard observable, cantilever deflection. In one embodiment, scattering occurs from below. FIG. 1B illustrates a second embodiment, which can be used with completely opaque samples by engineering a fiducial mark near the base of the cantilever and scattering from above. For purposes of the present invention, the tip region refers to either the tip itself or a fiducial with a fixed dimensional relationship to the tip, for example, with a fixed lateral offset from the tip.

Figure 2:
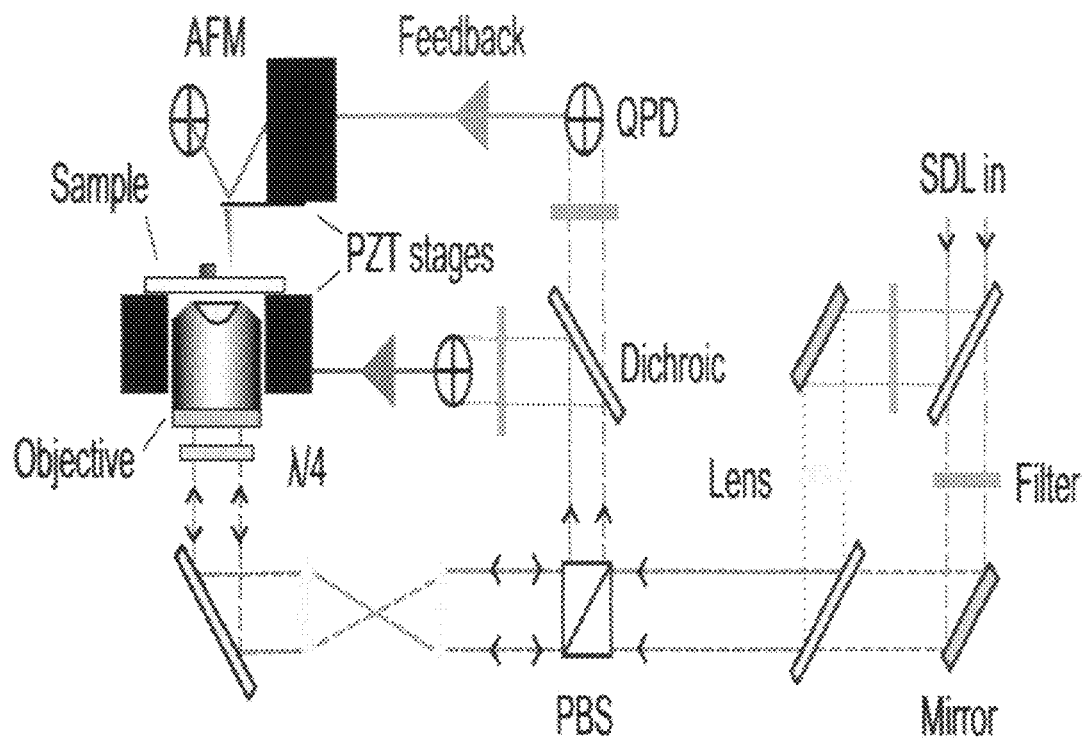
FIG. 2 illustrates one possible optical layout for use with the present invention.

FIG. 2 illustrates one possible optical layout. Two stabilized diode lasers (SDL) are launched into the system through a single fiber, which improves differential pointing stability. The beams are separated by wavelength for independent steering and focusing, then recombined and sent into the objective.

The laser beams can be focused with a variety of lenses (e.g., 1.4 NA oil immersion, 0.7 NA air gap). The laser beams can also be of a variety of wavelengths to maximize sensitivity or to penetrate substrates that are optically opaque to visible light (e.g. silicon wafers). The focused laser light scatters off the mark and can be detected in transmission or reflection geometries by detecting either forward or back-scattered light respectively. The laser most preferably has ultra-low noise characteristics which are typically achieved by active feedback, but this method is by no means limiting. The laser light will be scattered off the two or more mechanically independent structures either continuously or within certain predefined intervals to ensure that the separation between the structures does not vary within predefined limits.

Although the preferred embodiment was implemented in the context of an ultrastable atomic force microscope which uses two laser beams, this tip exchange registration can also be achieved with a single laser equipped with the ability to reproducibly scan over a large area. A single laser beam could be amplitude modulated, allowing for multiplexed detection of separate fiducial marks with a single photosensitive device via lock-in detection. The laser could be pulsed.

For instance, the dimensional position of the sample could be determined by scanning the lasers rapidly in x and y across a fiducial mark. The atomic force microscope tip position could then be determined by moving the laser to the vicinity of the tip and scanning the laser again in x and y to determine the tip position. This pair of measurements yields a delta x and delta y corresponding to the distance between the fiducial mark in the sample and the tip position determined in close proximity in time. This process is redone after tip exchange but this time finding the sample's fiducial mark and then setting the laser position to the predetermined delta x and delta y. The atomic force microscope's tip position would then be scanning mechanically until it was aligned to the laser and then lowered down to engage the sample. The converse procedure of scanning the sample instead of the tip would also work.

In addition, while a single laser beam can be used and preferably split by a beam splitter for multiple structure alignment and stabilization, in the case of two structure stabilization, at least one light beam could be independently steered (e.g., via a piezoelectric transducer (PZT) mirror, acousto-optic modulator, 2D translation lens, galvanometer mirror). Alternatively, for two structure stabilization with both structures mounted to independent translation stages, neither laser beam need be steered.

The invention is not limited to laser light, as coherent light can be substituted in place of a laser.

According to the present invention, a method for stabilization of one or more structures relative to another one or more structures includes using fiducial marks that are embedded in the structure or otherwise firmly coupled to the sample. A fiducial mark is not required if the structure possesses an inherent property that interacts with light to act as though it is a fiducial mark, for example, in a lens or a rough surface. The fiducial mark or feature/structure possessing the inherent property are required to scatter a detectable amount of incident light. For example, if a sample and lens are two structures being aligned, then the sample has a fiducial mark embedded in it, and the lens by its nature does not need a fiducial mark. In the case of stabilizing an atomic force microscope tip to the sample, there are three structures (the sample, atomic force microscope tip, and lens) to be stabilized. The sample has a fiducial mark, the lens does not, and the atomic force microscope tip may or may not act as a fiducial mark. Then the sample and atomic force microscope tip are stabilized relative to the lens.

Alternatively, when the structure is a lens, a focusing of incident light occurs. Thus, in the case of a lens, the focusing of incident light from at least a portion thereof is generally inherent and normally does not require a purposely made fiducial mark. In all of these cases one or more fiducial marks can be an integral part of the substrate surface.

Figure 6:
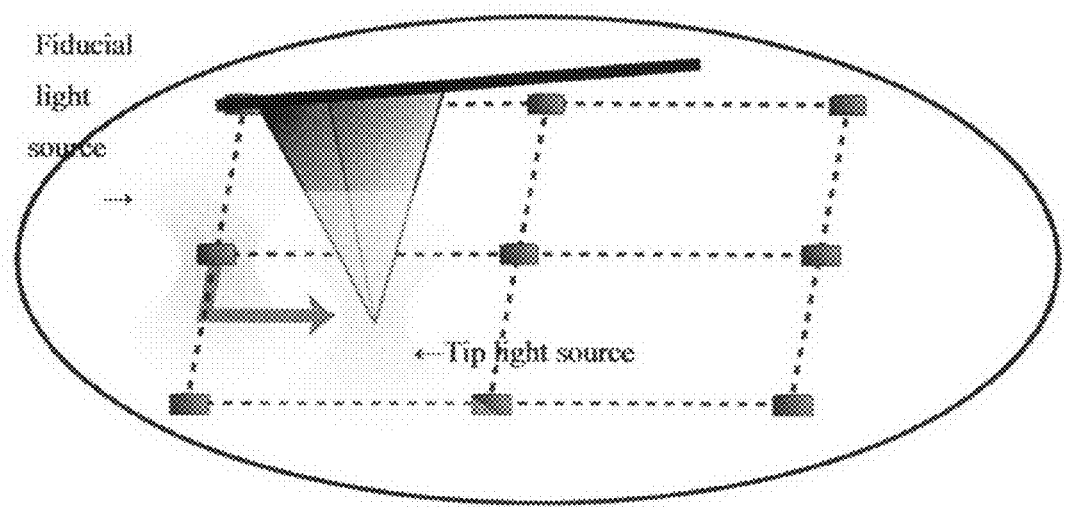
FIG. 6 illustrates registered tip exchange with the present laser-based coordinate system and an array of fiducial marks.

The ability to perform registered tip exchange with nanoscale precision and repeatability at more than one local region (~100×100 μm) separated by arbitrarily large distances would be highly beneficial. With the present laser-based coordinate system and an array of fiducial marks, the stage can be maneuvered over large lateral distances (e.g., ~1-100 cm) relative to the tip, allowing the same nanoscale feature to be revisited by indexing off a nearby fiducial mark (e.g., two fiducial marks down, one fiducial mark to the right, and then a local motion outlined in FIG. 6). Further, the tip itself can be replaced (e.g., if it is worn or broken), and a new tip can be returned to the same nanoscale feature by aligning the tip to its stationary detection laser. This process can be repeated at different locations on the substrate or sample, allowing for registered tip exchange with nanoscale precision at different locations separated by arbitrarily large distances.

The fiducials can comprise silicon posts, as disclosed in King, G. M., Carter, A. R., Churnside, A. B., Eberle, L. S. & Perkins, T. T. *Ultrastable atomic force microscopy: atomic-scale lateral stability and registration in ambient condition.* Nano Lett. 9, 1451-1456 (2009), incorporated herein by reference. The material composition and geometry of the fiducial mark is variable. All that is required is that the mark scatters a detectable amount of incident light. Examples of such marks include about 100-1000 nm tall, about 100-1000 nm diameter $SiO_2$ posts, lower profile about 10 nm tall, about 100 nm Au or Si disks, negative features such as about 100 nm deep, about 100 nm pits and even scanning microscope probe tips.

Back-scattered light from the sample and tip is separated and collected by a photosensitive device. Preferred photosensitive devices can include a quadrant photo diode, a position sensitive detector, and a charge coupled device. The photosensitive device(s) outputs an electronic signal which reveals the dimensional position of each fiducial mark and, hence, the dimensional position of each structure. These signals are used in a feedback loop which can keep the differential position stable, or to precisely scan the position between the two structures. The bandwidth of the stabilization is restricted by the time it takes to close the feedback loop. In practice, this is often limited by mechanical resonances (~1 kHz) of the positioning stage.

Referring to FIG. 2, there is a photosensitive device, which receives scattered light from either tip, laser or both and provides a signal to a feedback algorithm or processor and a controller, which serve as a feedback system to control the arrangement of the positioner, so that, for example, the distance "d" is maintained between the structures. The distance may be maintained for a predetermined period of time (time interval).

In a preferred embodiment, the back-scattered signals can be efficiently separated from the inward-propagating lasers by an optical isolator formed by a polarizing beam splitter (PBS) and a quarter waveplate ($\lambda/4$). Next, a dichroic mirror separates the signals onto two different quadrant photodiodes (QPDs). Movement of the fiducial mark in x and y relative to the detector beam causes a corresponding change in the distribution of light on the quadrant photodiode (QPD). Thus, the difference between the left and right halves measures the x signal, and the difference between the top and bottom halves yields the y signal. Vertical motion (z) is deduced by the sum signal, which is the total light falling upon the four quadrants of the quadrant photodiode. The resulting quadrant photodiode voltages can be amplified using custom built electronics and digitized. The sample's and tip's positions are preferably controlled via a feedback loop using a precision positioner. For force sensing, we reflected a 785 nm laser off the backside of the atomic force microscope cantilever and detected its deflection with a quadrant photodiode using a standard optical lever arm, as described in Meyer, G. & Amer, N. M. *Novel Optical Approach to Atomic Force Microscopy.* Appl. Phys. Lett. 53, 1045-1047 (1988), incorporated herein by reference.

Figure 4:
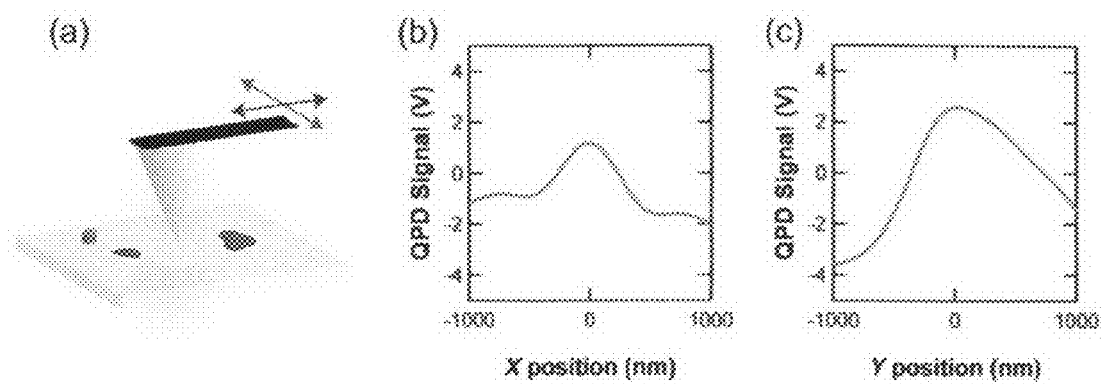
FIG. 4 illustrates centering the tip on the laser focus.

In addition to the aforementioned centering of the tip in the laser beam based on the quadrant photodiode x and y signals, the tip can be centered on the sum signal alone, as illustrated in FIG. 4. This would allow registered tip exchange based on a simpler optics perhaps with slightly decreased ultimate precision. In FIG. 4, the tip is held approximately 60 nm above the surface and slowly dithered sequentially in x and y, as depicted schematically in (a). In (b), the sum signal (or total light falling on the quadrant photodiode) is shown (green solid line). The lateral position of the tip is then adjusted to extremize this signal. The same process works in the vertical axis as well. Similarly, in (c), the sum signal is shown (green solid line) as the tip is dithered in y. The tip is centered to the beam in x and y by maximizing the sum signal in each dimension. It is possible to use different algorithms on different tips. Again, any offset can be predetermined and removed.

There is some optical crosstalk between the detection axes that leads to an erroneous signal on one axis when moving another. Substantial crosstalk (approximately 20%) is often observed when calibrating the atomic force microscope tip, because it is a geometrically asymmetric object tilted at 15° with respect to the y-axis (the cantilever's long axis). Field-programmable gate array (FPGA) cards (PCI-7833R and PCI-7831R, National Instruments) can be used to provide the computational power to parameterize and minimize such crosstalk via linear algebra-based algorithms, as described in Lang, M. J., Asbury, C. L., Shaevitz, J. W. & Block, S. M. *An automated two-dimensional optical force clamp for single molecule studies*. Biophys. J. 83, 491-501 (2002) and Churnside, A. B., King, G. M., Carter, A. R. & Perkins, T. T. *Improved performance of an ultrastable measurement platform using a field-programmable gate array for real-time deterministic control*. Proc. of SPIE 7042, 704205 (2008), both incorporated herein by reference in their entirety. FPGAs also provide for more rapid (500 Hz) and therefore precise controlling of all six axes of motion, leading to tip control of <0.04 nm in three dimensions (3D) in air.

For absolute alignment, all fiducial marks are scanned. This process allows the absolute center of each mark to be established and aligned by repositioning the precision translation stage. The feedback loop then maintains the alignment stably.

It should be understood that at least one of the two or more structures is preferably mounted on a precision positioning structure, referred to generically as a precision positioner. The precision positioner can be piezoelectric, and can include, but is not limited to, a translational stage. Preferably, the precision positioner comprises a nanopositioning system and the distance separating the two or more structures comprises a picometer-scale precision for a period of time or time interval. The precision positioner can comprise scanning stages and a high speed, multi-axis nanopositioning system. The translational stage, which is the preferred positioner, can be a two dimensional or three dimensional stage. One preferred embodiment is a closed loop, direct drive, 3D piezoelectric transducer (PZT) stage, such as P363.3CD and P733.3DD, Physik Instrumente.

The present invention utilizes a feedback loop. The related characteristic of the signal used for feedback purposes can be proportional, differential gain, integral gain, or any other mathematical relationship that can be used to provide a feedback loop.

Alternatively, a comparator could be used instead of a feedback algorithm or processor to compare the signal output from the photosensitive device with a control signal corresponding to a constant amount of separation between the structures. A person of ordinary skill in the art appreciates that the differential or comparison criteria could be any of voltage, current, power, phase, or frequency.

Figure 3:
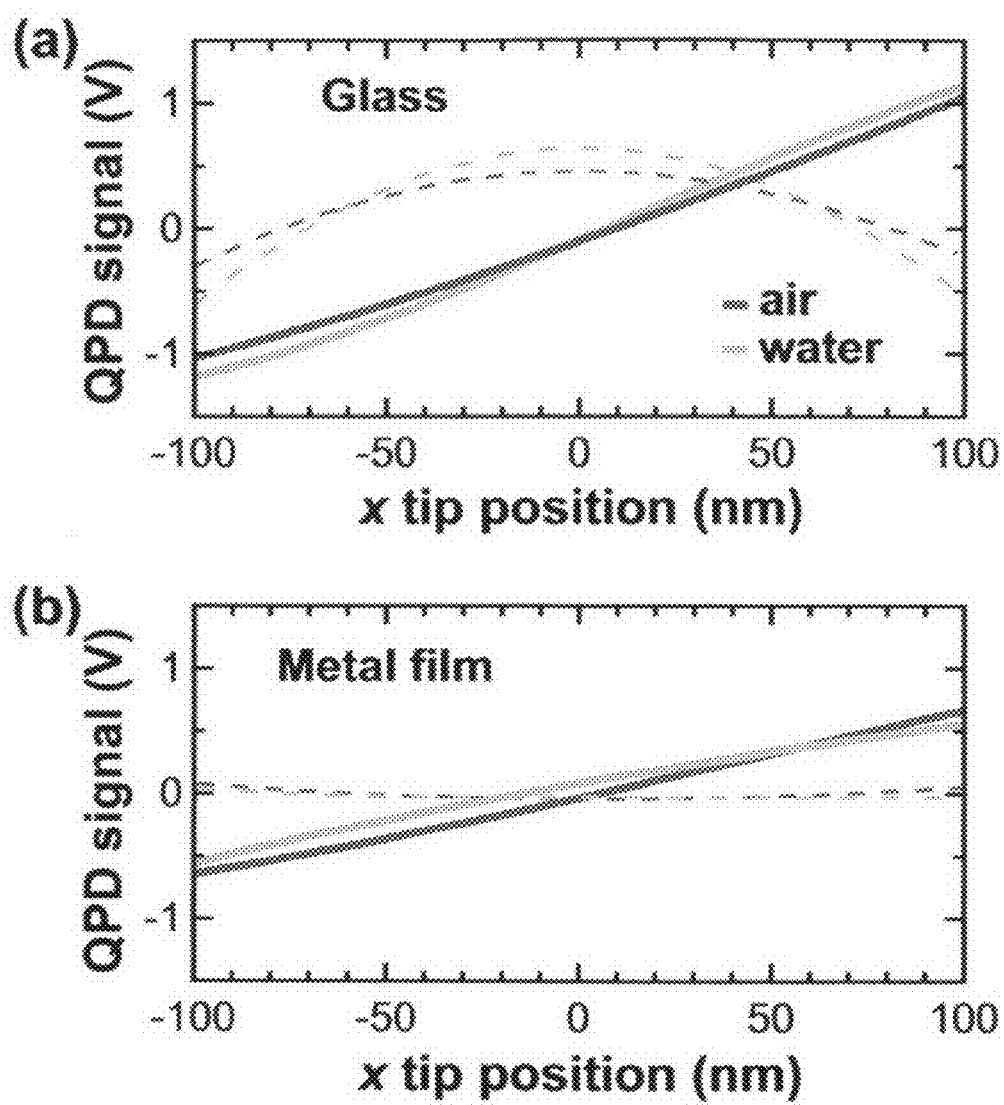
FIG. 3 illustrates the alignment of the tip: quadrant photodiode (QPD) signals as a tip was scanned along the x-axis through a detection laser.

The sample is preferably associated with a substrate. Exemplary substrates can include glass cover slips or opaque substrates. The sample may also be presented in alternative environments, such as vacuum, water or other liquid, and air. Different substrates and being in air and water yields similar results. FIG. 3 illustrates (a) Quadrant photodiode (QPD) signals as the tip was scanned along the x-axis through the detection laser. These records were measured through microscope cover glass with the tip in air (black) and submerged in water (grey).

Metallic or semiconducting substrates are compatible with the proposed optical stabilization. FIG. 1 shows two different detection geometries. In FIG. 1A, the detection laser is directly scattered off of the apex of the probe tip. Using this geometry with unmodified commercial tips and several substrates (glass, mica, thin metal films), the present method has been used to demonstrate tip detection in air and fluid at room temperature. The shape and material properties of the tip, as well as the wavelength of the laser, can be varied to suit different applications. For example, silicon wafers can be accommodated by using laser wavelengths where silicon is transparent.

Opaque or highly scattering substrates utilize a straightforward modification of detection geometry. Detection would come from above and a fiducial mark would be engineered near the base of the cantilever, identical to the sample's fiducial mark (FIG. 1B). A further benefit of this geometry is the ability to detect and compensate for noise in the z position of the tip holder. Such active noise suppression leaves only height changes on the sample to be measured by cantilever deflection. This six-axis active stabilization would be immediately applicable to industrial applications where, for example, AFMs are commonly operated in close proximity to noise generating semiconductor process equipment.

The present invention utilizes commonly available, commercial, unmodified tips. The useful tips can be of any size and shape, for example, symmetric pyramidal shaped tips. The technique works with uncoated as well as metalized tips. Exemplary tips include, but are not limited to, scanning tunneling microscope tips, atomic force microscope tips, near field scanning optical microscope tips, pipette tips, etc. The tip can act as its own fiducial or a fiducial mark can be engineered elsewhere on, near or into the cantilever assembly.

This process can be repeated with different types of tips. For tips whose structure was highly asymmetric (e.g. Olympus biolevers), a large offset may be found in the one axes, but a small offset in the other (e.g. [0 nm, −1000 nm]. This offset is generally reproducible between tips with the same class. This non-time varying offset can be subtracted once characterized. For improved registration of highly asymmetric tips, it is advantageous to align the tip and the stage in three dimensions.

Alignment can be automated based on the tip signal. Different alignment algorithms may yield slightly different offsets, but the critical issue is that the alignment is reproducible so that any offset is not time varying and can be quantified and removed.

Features can be aligned by translation through the laser beam to generate a calibration curve. There can be an alignment of two or more independent structures relative to each other, or relative to a shift of a known center, or the structures can be raster scanned with respect to each other. Various methods are known. In one example, the center of that structure can be chosen and called 0. One can then move one structure 10.1 nm relative to the other structure (e.g., a lens) by moving either structure 10.1 nm. The calibration curve can also be attained by moving the laser beam through the structure.

EXAMPLES 2.1 Experimental Apparatus

The apparatus used for these experiments, illustrated in FIG. 1A, was a custom built atomic force microscope mounted on top of a research grade optical microscope enhanced for mechanical stability. A full detailed discussion of the optics and instrumentation required for 3D back-scattered optical detection has previously been described by Carter, A. R., King, G. M. & Perkins, T. T. *Back-scattered detection provides atomic-scale localization precision, stability, and registration in 3D*. Opt Express 15, 13434-13445 (2007), incorporated herein by reference, as well as its application to ultrastable atomic force microscope at ambient conditions, described in Carter, A. R., King, G. M. & Perkins, T.

T. *Back-scattered detection provides atomic-scale localization precision, stability, and registration in 3D*. Opt Express 15, 13434-13445 (2007) and King, G. M., Carter, A. R., Churnside, A. B., Eberle, L. S. & Perkins, T. T. *Ultrastable atomic force microscopy: atomic-scale lateral stability and registration in ambient condition*. Nano Lett. 9, 1451-1456 (2009), also both incorporated herein by reference.

Briefly, we used a custom built atomic force microscope mounted on top of an inverted microscope (FIG. 2). A high numerical aperture microscope objective was used to separately focus a pair of lasers onto a commercial atomic force microscope tip (OTR-4, k=0.08 N/M (Veeco)) and a silicon fiducial mark (r=250 nm, h=40 nm) fabricated onto a glass cover slip. The back-scattered signals were efficiently separated from the inward-propagating lasers by an optical isolator formed by a polarizing beam splitter (PBS) and a quarter waveplate ($\lambda/4$). Next, a dichroic mirror separated the signals onto two different quadrant photodiodes (QPD).

Movement of the fiducial mark in x and y relative to the detector beam caused a corresponding change in the distribution of light on the quadrant photodiode. Thus, the difference between the left and right halves measured the x signal, and the difference between the top and bottom halves yielded the y signal. Vertical motion (z) was deduced by the sum signal, which is the total light falling upon the four quadrants of the quadrant photodiode. The resulting quadrant photodiode voltages were amplified using custom built electronics and digitized. The sample's and tip's dimensional positions were controlled via a feedback loop using a pair of closed loop, direct drive, 3D piezoelectric transducer (PZT) stages (P363.3CD and P733.3DD, Physik Instrumente). For force sensing, we reflected a 785 nm laser off the backside of the atomic force microscope cantilever and detected its deflection with a quadrant photodiode using a standard optical lever arm. Meyer, G. & Amer, N. M. *Novel Optical Approach to Atomic Force Microscopy*. Appl. Phys. Lett. 53, 1045-1047 (1988).

Field-programmable gate array (FPGA) cards (PCI-7833R and PCI-7831R, National Instruments) were used to provide the computational power to parameterize and minimize crosstalk via linear algebra-based algorithms, as described in Lang, M. J., Asbury, C. L., Shaevitz, J. W. & Block, S. M. *An automated two-dimensional optical force clamp for single molecule studies*. Biophys. J. 83, 491-501 (2002). and Churnside, A. B., King, G. M., Carter, A. R. & Perkins, T. T. *Improved performance of an ultrastable measurement platform using a field programmable gate array for real-time deterministic control*. Proc. of SPIE 7042, 704205 (2008), both incorporated herein by reference. Field-programmable gate arrays (FPGAs) also provided for more rapid (500 Hz) and therefore precise controlling of all six axes of motion, leading to tip control of <0.04 nm in 3D in air.

We used Olympus OMCL-TR400PSA tips for the initial phase of the experiment. These are symmetric pyramidal shaped tips.

2.2 Sample Preparation

We used patches of bacteriorhodopsin (BR) to demonstrate this technique. Our protocol for adsorption of patches of BR from *Halobacterium salinarium* (Sigma) was adapted from Muller, D. J. & Engel, A. *Atomic force microscopy and spectroscopy of native membrane proteins*. Nat. Protoc. 2, 2191-2197 (2007). and Goncalves, it P., Agnus, G., Sens, P., Houssin, C., Bartenlian, B & Scheuring, S. *Two-chamber AFM: probing membrane proteins separating two aqueous compartments*. Nat. Methods 3, 1007-1012 (2006), both incorporated herein by reference, for use on glass cover slips (Corning). Silicon posts were added as fiducial marks, as described in King, G. M., Carter, A. R., Churnside, A. B., Eberle, L. S. & Perkins, T. T. *Ultrastable atomic force microscopy: atomic-scale lateral stability and registration in ambient condition*. Nano Lett. 9, 1451-1456 (2009), incorporated herein by reference.

2.3 Initial Alignment of Sample and Tip

We sequentially aligned the stage to one laser and the tip to the second laser.

First, the sample was positioned in 3D with respect to the laser focus that tracked the fiducial mark embedded in the substrate. We aligned the 845 nm laser focus to a silicon disk on the cover slip by using an automated routine that controlled the sample piezoelectric transducer (PZT) stage. The general shape of the lateral signals (e.g. x and y axes) was the derivative of the Gaussian, which allowed automated alignment (See Carter, A. R., King, G. M. & Perkins, T. T. *Back-scattered detection provides atomic-scale localization precision, stability, and registration in 3D*. Opt Express 15, 13434-13445 (2007), incorporated herein by reference.) The exact functional form is not critical. The vertical signal, which can be offset amplified for enhanced sensitivity, was referenced to a maximum or minimum in the offset amplified sum signal. Typically, the final position of the fiducial mark was chosen to reside halfway between the maximum and minimum as the region of highest sensitivity.

We next raster scanned the sample around this alignment point through a ~200×200×100 nm$^3$ volume that constituted the calibrated dynamic range. We then used a feedback loop to hold the sample stationary with respect to its laser or to perform scanning based on the parameterized back-scatter detection (BSD) signals. Three dimensional alignment improves registered tip exchange but is not necessary. Following the above protocol in two dimensions can lead to registered exchange with slightly reduced registration.

FIG. 3 illustrates the alignment of the tip. The tip was aligned relative to the tip detection laser. Different substrates and being in air and water yielded similar results. (a) Quadrant photodiode (QPD) signals as the tip was scanned along the x-axis through the detection laser. These records were measured through microscope cover glass with the tip in air (blank) and submerged in water (grey). On-axis signals (solid lines) and lateral crosstalk signals (dashed lines) are displayed. (b) Analogous records acquired through a thin metal film (2 nm Ti+6 nm Au) on glass. Records were digitized with the same electronic gain settings as in FIG. 3, but with a silicon-nitride tip. These proof-of-principle signals show that tip-based back-scatter detection (BSD) is compatible with different environments (aqueous) and different substrates (thin metallic surfaces).

Next, we coarsely centered the atomic force microscope tip on the 810 nm laser focus using a CCD camera (not shown). We then touched the tip to the surface and retracted it 60 nm with the tip's piezoelectric transducer (PZT) stage. We then aligned the tip with respect to its laser. In one method, we can minimize crosstalk between signals (Vx, Vy, and Vz) (FIG. 3) as previously discussed in King, G. M., Carter, A. R., Churnside, A. B., Eberle, L. S. & Perkins, T. T. *Ultrastable atomic force microscopy: atomic-scale lateral stability and registration in ambient condition*. Nano Lett. 9, 1451-1456 (2009), incorporated herein by reference. This alignment was achieved by dithering the atomic force microscope tip along each axis sequentially and changing the center position of the dither in 3D. This alignment can be automated based on the tip signal. Different alignment algorithms may yield slightly different offsets, but the critical issue is that the alignment is reproducible so that any offset is not time varying and can be quantified and removed.

For stabilized imaging after this alignment, the tip signals in 3D (Vx, Vy, Vz) were finally calibrated around this location. In one realization, the tip is raster scanned in 3D through its detector beam using a closed-loop piezoelectric transducer (PZT) stage. The resulting back-scattered signals (Vx, Vy, Vz) corresponding to stage movements (xPZT, yPZT, zPZT) (FIGS. 4a, b) could be scaled using a parameterization. For instance, one can use a 4th order polynomial. Feedback to the tip's piezoelectric transducer (PZT) stage kept the tip stationary relative to its laser focus.

As an alternative alignment, the tip and sample can be aligned to their respective lasers using the sum signal from the quadrant photodiode alone. As shown in FIG. 4, the tip is iteratively scanned in one dimension (x or y) while the sum of the power falling on the quadrant photodiode is observed (FIG. 3). The lateral position of the tip is then adjusted to extremize this signal. The same process works in the vertical axis as well. It is possible to use different algorithms on different tips. Again, any offset can be predetermined and removed.

2.4 Imaging

We imaged in contact mode at a constant force. The imaging mode is not central to our technique. Multiple imaging modes are possible: constant force, dynamic modes, force volume etc. As is traditional in contact mode atomic force microscopy, the feedback to the stage constituted the topographic imaging signal. We averaged 2 ms of data at each pixel into a single point (unless otherwise stated) and used a 5 nm pixel spacing. To quantify the registration between successive images, we used a two dimensional (2D) cross correlation analysis and tracked the measured maximum in the cross correlation between conditions.

2.5 Re-Aligning the Same Tip

We retracted the tip and dewetted it and then started the whole process again using OTR-4. It is important to note that the sample does not need to be stabilized during this interchange. Generally, the drift of the sample during such a process did not lead to an ambiguity in which fiducial mark was being used. If necessary, one could either (a) indentify a unique registration mark by counting lateral and vertical marks from a corner in the array of fiducial marks, (b) use an external interferometer, or (c) individualize fiducial marks in an asymmetric pattern either at the level of spacing between marks and/or the marks themselves.

To demonstrate the exchange, we imaged a patch with a highly unique and asymmetric feature membrane patch caused by scraping the tip through the membrane patch. In the proof-of-principle alignment, two dimensional cross correlation between FIG. 5a and the image of the same sample after rewetting (FIG. 5b) showed a registration of [25 nm, 0 nm], in x and y respectively. More careful control of imaging conditions, improved signal to noise of the images, and scanning over smaller regions can improve this alignment.

Figure 5:
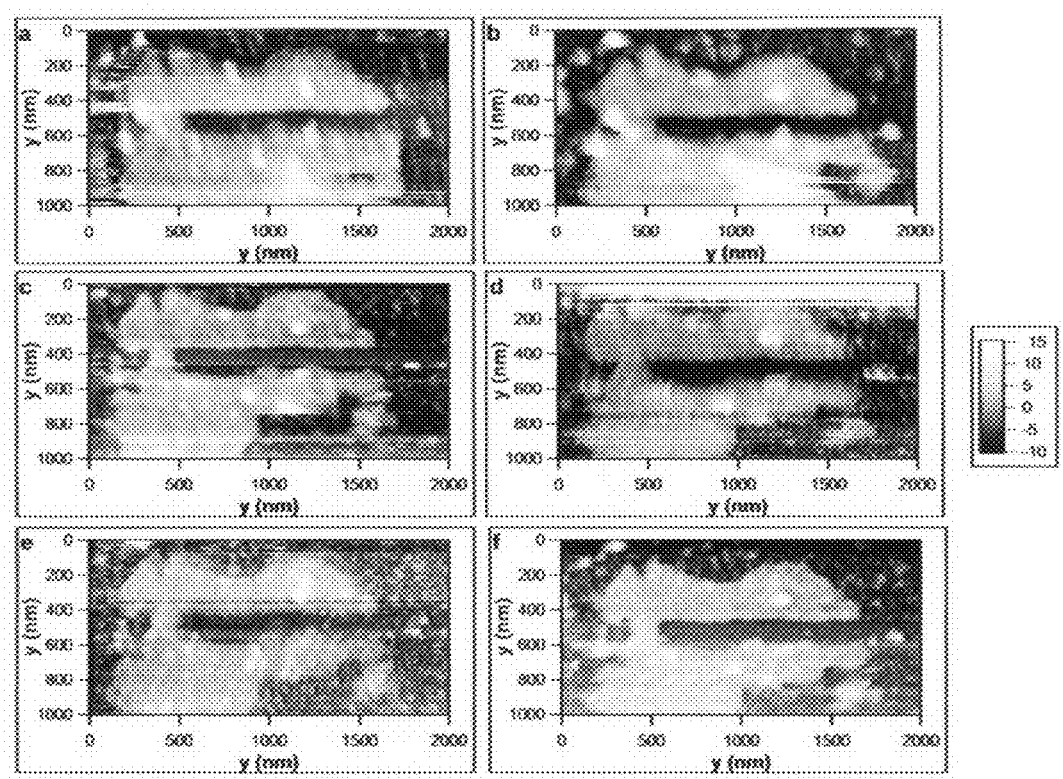
FIG. 5 illustrates atomic force microscope (AFM) images of a feature taken over the course of a day with the different tips, utilizing the present invention.

The atomic force microscope images shown in FIG. 5 demonstrate the instrument's ability to return to a feature over the course of a day. (a) Image acquired at 12:07 PM. (b) Image acquired with the same tip, after removing the tip from the fluid and re-immersing it, 3:04 PM. (c)-(e) Images after replacing tip with new tip, at 4:22, 4:32, 4:39, and 4:48 PM. (f) Acquired after raising the tip out of the fluid and re-immersing it in fluid.

We used biological material for this proof-of-principle demonstration. Higher precision would certainly be achieved using small fiducial marks (e.g., 5 nm gold beads). In the images shown in FIG. 5, there is clear degradation of the soft sample that limited the registration.

2.6 Exchanging the Same Type of Tips

We next removed the tip holder completely, put in a new tip and the repeated the whole process again. This yielded the images shown in FIGS. 5c-e. The registration between images FIG. 5A and FIG. 5C separated over three hours and different tips [−35 nm, −19 nm] was based on the image analysis on the central portion of the image. Again, it is immediately clear the same individual structure is being imaged. Also, the degradation of the sample is the limit to the cross correlation analysis. Harder samples and/or more gentle imaging modes will lead to higher precision during this process.

Also it is clear that exchange of tips led to a sharper, higher quality image in FIG. 5c compared to FIG. 5b. This demonstrates the usefulness of replacing a degraded tip for a new high quality tip. Note the improvement in sharpness of the image from FIGS. 5a to 5b. Most likely a protein contaminant present during imaging shown in FIG. 5a was removed during dewetting. Similar behavior is seen between FIGS. 5e and 5f. Individual tips could also be chemically cleaned, for instance by washing gold tips with a reducing agent to cleave cysteine labeled protein bound to gold coated tip.

2.7 Exchanging Different Type of Tips

This process can be repeated with different types of tips. For tips whose structure was highly asymmetric (e.g. Olympus biolevers), we found a large offset in the one axes but a small offset in the other (e.g. [0 nm, −1000 nm]. This was offset generally reproducible between tips with the same class. Thus, this non time varying offset can be subtracted once characterized. For improved registration of these highly asymmetric tips, it is advantageous to align the tip and the stage in three dimensions.

The invention has been described in detail with particular reference to certain preferred embodiments thereof, but it will be understood that variations and modifications can be effected within the spirit and scope of the invention.

The invention claimed is:

1. A method for rapidly and repeatably bringing sharp objects into close nanoscale proximity to a particular region of interest of a surface comprising:
   a. projecting focused laser light onto a first tip region of a scanning probe microscope to produce back-scattered light;
   b. projecting focused laser light onto a region of interest of a sample to produce back-scattered light;
   c. receiving the back-scattered light by a photosensitive device, said photosensitive device converting the received back-scattered light into one of electrical or optical signals capable of identifying the dimensional positions of said first tip and said region of interest and the distance between the dimensional positions of said first tip and said region of interest;
   d. aligning said positions with respect to said focused laser light;

e. providing an output control signal related to the signal output from the photosensitive device from a feedback algorithm/process to a precision positioner to stably maintain the alignment of said positions over a time interval;
f. removing the first tip of the scanning probe microscope;
g. replacing the first tip of the scanning probe microscope with a second tip; and
h. returning said second tip to the identified dimensional positions of said first tip and said region of interest with said precision positioner.

2. The method of claim 1 wherein said dimensional positions are 1, 2 or 3 dimensional positions.

3. The method of claim 1 wherein said receiving the back-scattered light occurs from either below or above the surface of said region of interest of a sample.

4. The method of claim 1 wherein said second tip is the first tip, wherein said first tip has been cleaned or otherwise processed after said removing but before said replacing.

5. The method of claim 1 wherein said second tip is the same class or type of tip as the first tip.

6. The method of claim 1 wherein said second tip is a different class or type of tip than said first tip.

7. The method of claim 6 wherein said returning further comprises an algorithm having a reproducible offset for said different class or type of tip, which offset can be quantized and removed.

8. The method of claim 1 wherein said removing, replacing and said returning is additionally repeated.

9. The method of claim 1 wherein at least one of said removing, replacing and returning follows a time interval.

10. The method of claim 1 wherein said aligning locates an absolute center of said tip region or said region of interest.

11. The method of 1 wherein the tip region is the tip.

12. The method of claim 1 wherein the tip region is a fiducial offset from the tip.

13. The method of 1 wherein the region of interest is a fiducial mark.

14. The method of claim 1 wherein the region of interest is a structure possessing an inherent property that interacts with light to act as though it is a fiducial mark.

15. The method of claim 1 wherein the region of interest is a structure located at a lateral offset from a fiducial mark.

16. The method of claim 1 wherein said sample comprises an array of fiducial marks.

17. The method of claim 1 wherein two focused lasers are used for projecting focused laser light onto said first tip region of a scanning probe microscope to produce back-scattered light and projecting focused laser light onto a region of interest of a sample to produce back-scattered light.

18. The method of claim 1 wherein said method is conducted at room temperature.

19. The method of claim 1 wherein said method is conducted in air or fluid.

20. A method for rapidly and repeatably bringing sharp objects into close nanoscale proximity to a particular region of a surface comprising:
a. projecting focused laser light onto a first tip region of a scanning probe microscope to produce back-scattered light;
b. projecting focused laser light onto a first region of interest of a sample to produce back-scattered light;
c. receiving the back-scattered light by a photosensitive device, said photosensitive device converting the received back-scattered light into one of electrical or optical signals capable of identifying the dimensional positions of said first tip and said feature and the distance between the dimensional positions of said first tip and said region of interest;
d. aligning said positions with respect to said focused laser light;
e. providing an output control signal related to the signal output from the photosensitive device from a feedback algorithm/process to a precision positioner to stably maintain the alignment of said positions over a time interval;
f. replacing the first region of interest of a sample with a second region of interest of a sample;
g. projecting focused laser light onto said second region of interest of a sample to produce back-scattered light and repeating said receiving the back-scattered light by a photosensitive device, said aligning said positions with respect to said focused laser light, said providing an output control signal related to the signal output from the photosensitive device from a feedback algorithm/process to a precision positioner to stably maintain the alignment of said positions over a time interval with respect to said tip region and said second region of interest of a sample; and
h. returning said tip region to the identified dimensional positions of said tip region and said first region of interest with said precision positioner.

* * * * *

UNITED STATES PATENT AND TRADEMARK OFFICE
CERTIFICATE OF CORRECTION

PATENT NO. : 8,387,158 B2
APPLICATION NO. : 12/806086
DATED : February 26, 2013
INVENTOR(S) : Thomas T. Perkins, Gavin M. King and Ashley R. Carter It is certified that error appears in the above-identified patent and that said Letters Patent is hereby corrected as shown below:

Title Page, (73) Assignee, after "The United States of America as represented by the Secretary of Commerce, The National Institute of Standards and Technology, Washington, DC (US)", insert --The Regents of the University of Colorado, Denver, CO (US)--.

Signed and Sealed this
Fourth Day of June, 2013

Teresa Stanek Rea
*Acting Director of the United States Patent and Trademark Office*